3 Sheets—Sheet 1

H. TIMMERSMANN.
Corn-Planter.

No. 200,415. Patented Feb. 19, 1878.

Witnesses:
J. Russell Barr
J. P. Theodore Lang

Inventor:
Henry Timmersmann
by Mason, Fenwick & Lawrence
Attys

N. PETERS, PHOTO-LITHOGRAPHER, WASHINGTON, D. C.

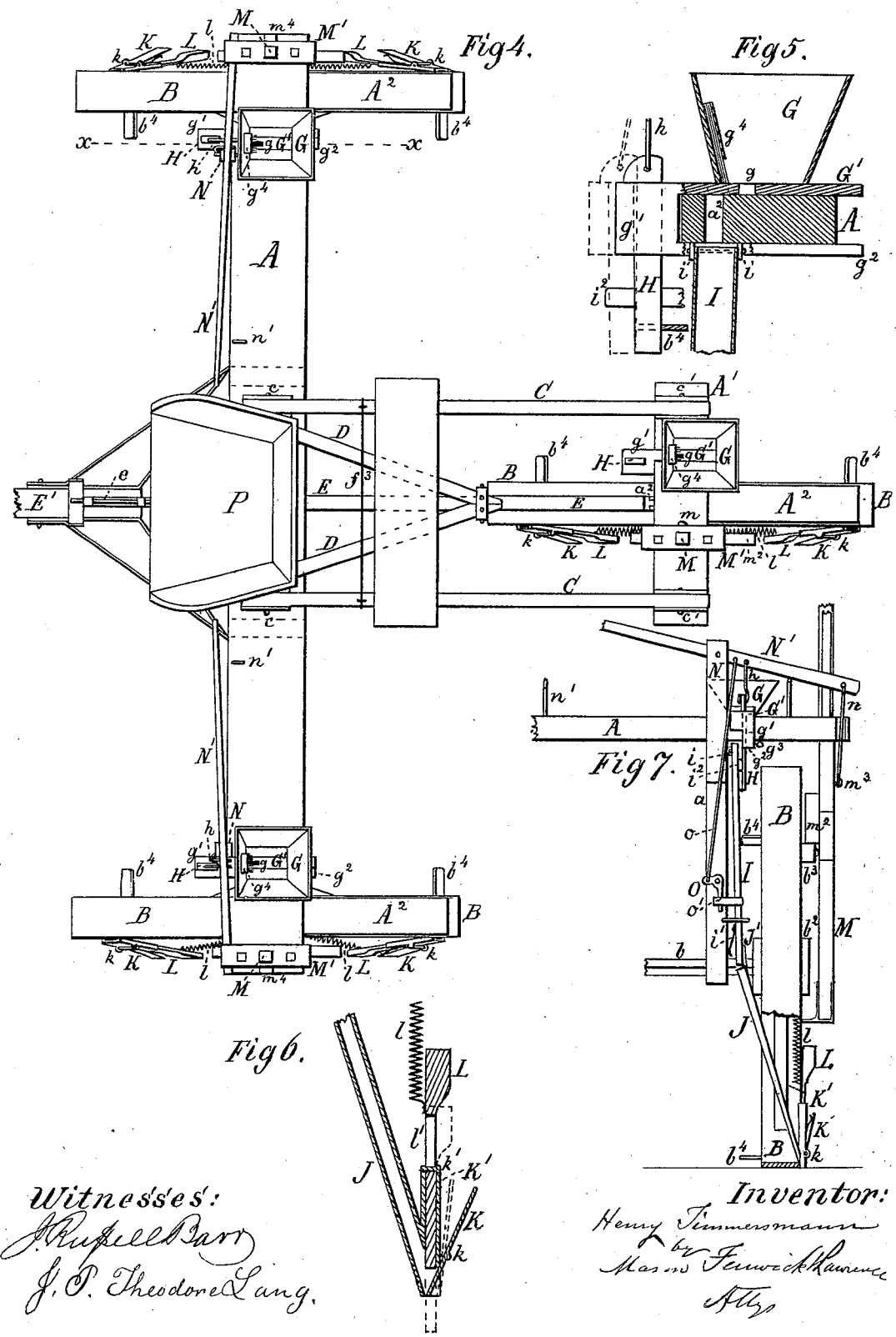

H. TIMMERSMANN.
Corn-Planter.
No. 200,415. Patented Feb. 19, 1878.
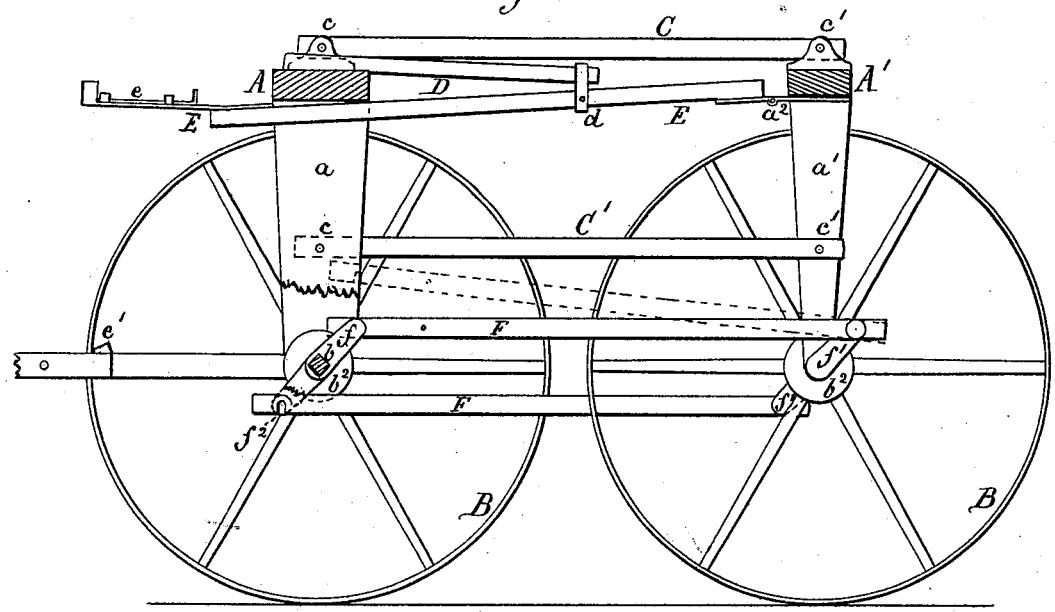
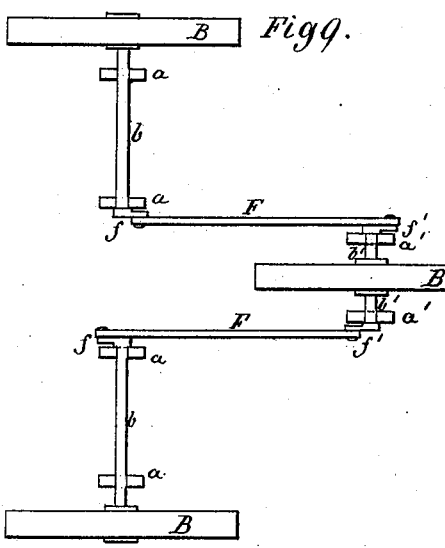
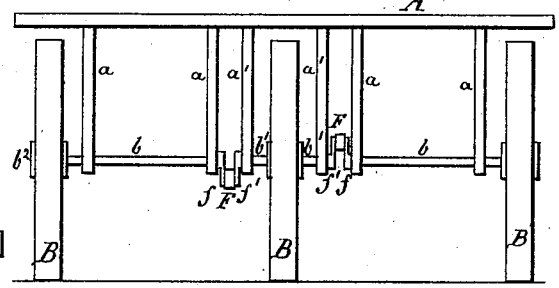
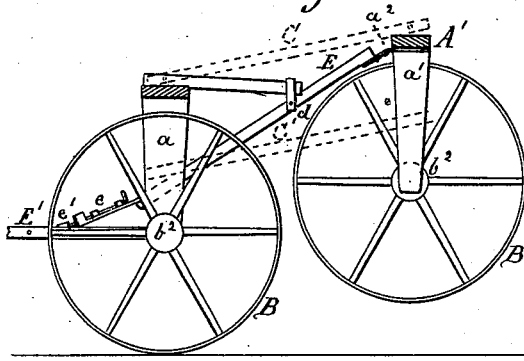
Witnesses:
J. Russell Barr
J. P. Theodore Lang.
Inventor:
Henry Timmersmann
by
Mason Fenwick Lawrence
Attys.

UNITED STATES PATENT OFFICE.

HENRY TIMMERSMANN, OF MUSCATINE, IOWA.

IMPROVEMENT IN CORN-PLANTERS.

Specification forming part of Letters Patent No. 200,415, dated February 19, 1878; application filed November 14, 1877.

*To all whom it may concern:*

Be it known that I, HENRY TIMMERSMANN, of the city and county of Muscatine, in the State of Iowa, have invented a new and useful Improvement in Corn-Planters, which improvement is fully set forth in the following specification and accompanying drawings, in which latter—

Figure 1:
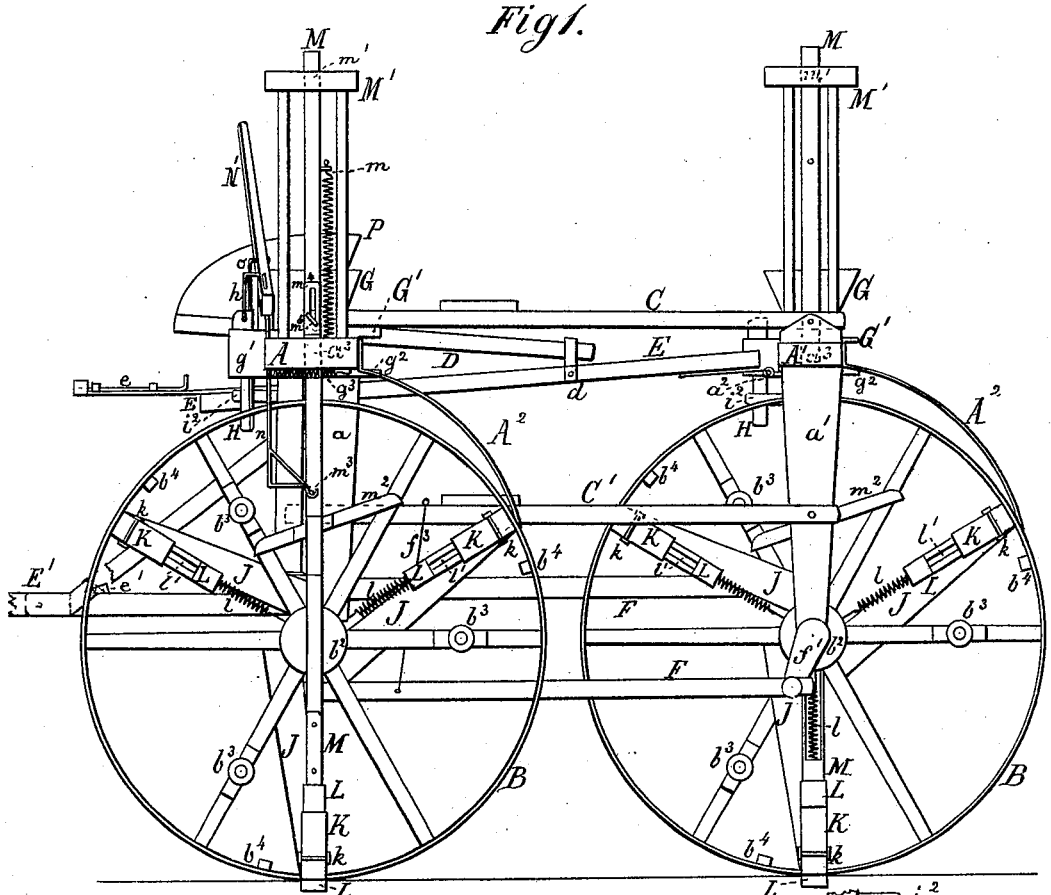
Figure 2:
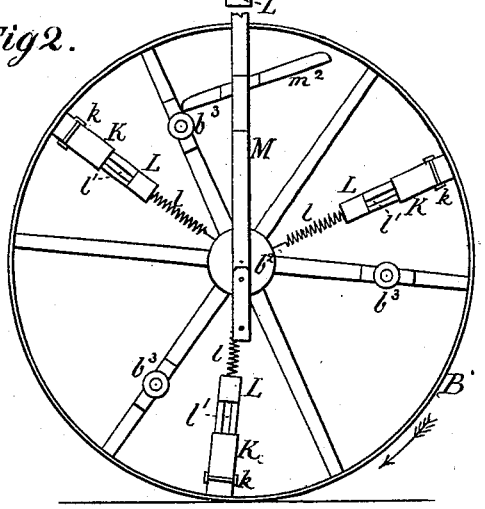
Figure 3:
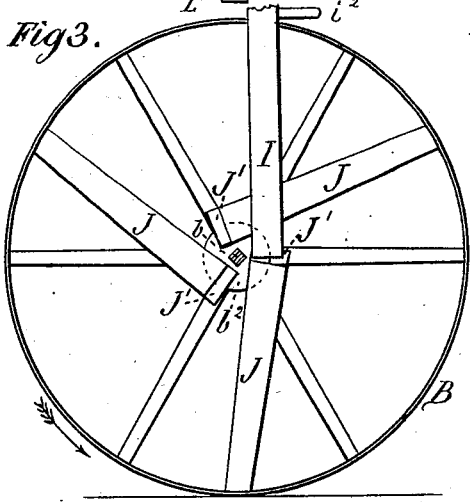

Figure 1 is a side elevation of my improved corn-planter. Fig. 2 is a detail view of one of its wheels, showing the arrangement and operation of the seed-plungers. Fig. 3 is a detail view of one of the wheels, showing the arrangement and operation of the seed-tubes. Fig. 4 is a top view of my improved corn-planter. Fig. 5 is a detail vertical section and partial elevation of the hopper, seed-slide, and vibrating seed-tube, the line $x\ x$, Fig. 4, indicating where the section is taken. Fig. 6 is a vertical central section of one of the revolving seed-tubes and the seed-plunger thereof. Fig. 7 is a side view of one of the hoppers with its distributing-slide, vibrating seed-tube, wheel with revolving seed-tube, seed-plungers, plunger-rod, and a hand-lever for putting the vibrating seed-tube, slide, and plunger-rod out of action. Fig. 8 is a sectional view, chiefly illustrating the coupling of the rear wheel with the front wheels, the parallel coupling of the rear frame with the front frame, and the hoisting-levers of the rear frame and wheel. Fig. 9 is a horizontal diagram of the wheel-couplings. Fig. 10 is a front and vertical diagram of the same. Fig. 11 is a vertical diagram of the frames and wheels, showing the rear planting-wheel and frame thereof hoisted from the ground.

The nature of my invention consists in certain constructions, combinations, and arrangements of parts hereinafter fully described and specifically claimed, whereby a corn-planter is produced which plants either two or three rows of corn at one time, at equal distances apart, and with less and simpler means than has been done heretofore.

In the drawings, A represents the front frame, supported by two wheels, B, by means of brackets $a$, which contain the bearings of the axles $b$. $A^1$ represents the rear frame with brackets $a^1$, containing the bearings of the axle $b^1$ of the rear wheel B, which latter wheel is arranged to travel midway between the front wheels. The said front and rear frames are connected by two pairs of parallel bars, C and C', which are pivoted at $c$ to the front frame and at $c'$ to the rear frame, in such manner as to form two equal parallelograms, one at each side of the said frames. This described construction of the bars C C' serves to keep the two frames parallel to each other when the rear frame is either lowered or hoisted.

From the front frame a couple of converging bars, D, extend about half-way back to the rear frame, and at the end are provided with a fulcrum, $d$, for a foot-lever, E, which is connected with the rear frame by means of a hinge, $a^2$. The front end of the foot-lever E is provided with a bolt, $e$, which may be secured to a staple, $e'$, on the tongue E' in case the operator has hoisted the rear frame off the ground and desires it to remain so. The front and rear wheels are coupled so as to make the same number of revolutions in a given time. The front axles $b$ are provided with cranks $f$ at their ends, between the two middle brackets $a$, and the rear axle $b^1$ is at both ends, outside the brackets $a^1$, provided with cranks $f^1$. Each crank $f$ is coupled by a connecting-rod, F, to one of the cranks $f^1$, and, to make the said coupling more effective, the cranks on the one side of the machine may be set at an angle with those on the other side.

The connecting-rods F are provided at their front with open slots $f^2$, (shown in Fig. 8,) by means of which they are connected or disconnected from the front cranks, a cord, $f^3$, being attached for the purpose of lifting said connecting-rods out of range of the front cranks by the driver on the seat. Above each wheel a hopper, G, is attached to each frame, at the bottom of which a slide, G', with an opening $g$, is attached crosswise to the frames A and $A^1$. The head $g^1$ of the said slide has a vertical drop-pin, H, loosely fitted into it, which may be elevated or lowered by means of a rod, $h$. Below the frames A $A^1$ the head $g^1$ is provided with a tongue, $g^2$, and a tension-spring, $g^3$, whereby the slide is kept in the position shown in Fig. 5. A brush, $g^4$, on the front board of the hopper prevents the overcrowding of the opening $g$ with seed when the slide G' is moving to the front. The frames A $A^1$ are provided with passages $a^2$, through which the seed passes down into the tube I. The tube I is pivoted at $i$ to the frame, so that its lower end may swing to and from the wheel below. A spring, $i^1$, pushes the lower end of the tube I toward the hub of the wheel. To the hub $b^2$ of the wheel B a number of tubes, J, are fastened, which terminate at the rim or periphery of the wheel B. As the inner ends of the tubes J are eccentrically arranged around the wheel-axle, they move by turns in line with the upper tube I, which is alternately pushed by each tube J toward the bracket $a$ or $a^1$, and then, by the spring $i^1$, over the tube J just when they are in line. The back of each tube J is provided with an extension-guard, J', which prevents the tube I from being pushed out of line by the spring $i^1$.

The drop-pin H is held in position by a horizontal arm, $i^2$, of the tube I. The tube J is closed at the periphery of the wheel by a spring-valve, K, pivoted at $k$. Between the spring-valve K and the tube J a tubular bearing-guide, K', is inserted, in which the plunger L slides. The plunger L is provided with a tension-spring, $l$, whereby it is kept out of the tube J, and a slot, $l'$, through which a stop-pin, $k'$, of the bearing-guide K' passes, and by means of which the spring $l$ is prevented from pulling the plunger L out of its bearing, as shown in Fig. 6. When the plunger L is forced out beyond the periphery of the wheel B, it forces the valve K open, and at the same time pushes the seed which has been deposited in the tube J into the ground.

The plungers L are operated by a drop or plunger rod, M, which receives the necessary force by aid of a tension-spring, $m$, and slides vertically in suitable bearings at $a^3$ in the frame of the machine, and at $m^1$ in an elevated frame, M', attached to the frame. The spokes of the wheel are provided with lifting-rollers $b^3$, which, by turns, engage and lift an inclined cross-bar, $m^2$, of the drop-rod M, and thus operate the same. An adjustable check, $m^4$, fastened by a set-screw, $m^5$, upon the drop-rod M, above the frame of the machine, serves to regulate the stroke of the drop-rod, and consequently the plunger L. The wheel B has a number of horizontal arms, $b^4$, which, in turn, strike the drop-pin H of the slide G', and move it forward until the opening $g$ is in line with the passage $a^2$, whereby the seed is discharged into the tube I. The frame A is provided with fulcrum-stands N, which support hand-levers N'. The outer end of each hand-lever N' is connected by a rod, $n$, with a pin, $m^3$, on the drop-rod M. The rod $h$ of the drop-pin H is attached to the same end of the hand-lever N' which operates a bell-crank lever, O, on the bracket $a$. A connecting-rod, $o'$, communicates motion from the bell-crank lever to the tube I. When the free arm of the lever N' is moved down, the rod $n$ prevents the operation of the drop-hammer M by keeping it at its highest elevation. The rod $h$ keeps the drop-pin H at its highest elevation, and out of range of the arms $b^4$. The rod $o$, by means of the bell-crank lever O and connecting-rod $o'$, keeps the tube I close against the bracket $a$, and prevents its wearing against the revolving tubes J. Thus the lever N' serves to throw the whole seed and planting gear out of operation. A hook, $n'$, on the frame A serves to keep the hand-lever N' in the described position.

The described stopping device is or may be omitted on the rear frame $A^1$, as the disconnection of the connecting-rods F from the front cranks and the hoisting of the rear frame $A^1$ effect the same result as the above-described operation of the hand-lever N'.

The seat P of the driver is attached to the front frame A. The wheels are kept free from mud and clogs by scrapers $A^2$ attached to the frames.

Operation: When the machine is to be moved out into the field the operator moves the front end of the foot-lever E down upon the tongue E', and pushes the bolt $e$ into the staple $e'$, whereby the rear frame $A^1$ is and remains hoisted. He then disconnects the connecting-rods F by pulling their front ends up with the cords $f^3$, and puts the seed and planting gear out of operation by moving the free ends of the hand-levers N' down and securing them to the hooks $n'$, and when in the field the rear frame $A^1$ is again let down to the ground by withdrawing the bolt $e$ and allowing the foot-lever E to move up toward the seat P. The connecting-rods F are then secured to the front cranks $f$, and the hand-levers N' disconnected from the hooks $n'$.

The machine is now supplied with seed and started, and as the wheels B revolve the drop-pins H of the respective wheels B are struck by the arms $b^4$, and moved ahead until the openings $g$ of the slides G' are in line with the tubes I, into which the seed is then discharged. Just at this moment one of the tubes of the respective wheels is moved into line with a tube, I, and the seed enters the said tube J and collects on the valve K. In the mean time the drop-rod M of the respective wheels has been lifted to its highest elevation by one of the rollers $b^3$, and is now allowed to drop with force upon a plunger, L, which enters the tube J and forces the seed out the tube into the ground by pushing the valve K aside.

Having described my invention, what I claim as new, and desire to secure by Letters Patent, is—

1. In a corn-planter, the combination of the frames A $A^1$ and the parallel connecting-rods C C', whereby the frame $A^1$ can be adjusted in and out of operation at will, substantially as set forth.

2. In a corn-planter, the combination of the coupled frame A $A^1$, tongue E', having a staple, $e'$, the bars D, the fulcrum $d$, and the foot-lever E, having a bolt, $e$, whereby the frame $A^1$ is raised and held so, or lowered, substantially as set forth.

3. In a corn-planter with two front wheels and one middle rear wheel and coupled frames A A¹, the combination of the axles $b$ $b^1$, cranks $f$ $f^1$, and detachable connecting-rods F, substantially as and for the purpose set forth.

4. The carriage-wheel B, provided with conducting-spouts, valves, plungers, and arms $b^4$, in combination with the laterally-vibrating tube I, the hopper G, slide G′, tension-spring $g^3$, drop-pin H, and drop-rod M, the latter attached to the frame A, substantially as and for the purpose described.

5. The combination, with the carriage-wheel B, provided with the conducting-spouts, valves, and plungers, of the hopper and its connections and the laterally-vibrating tube, which intermittingly occupies an oblique position between the hopper and the wheel B, substantially as and for the purpose described.

6. The combination of the revolving tube J, plunger L, and spring-valve K, carriage-wheel B, and reciprocating drop-rod M attached to frame A, substantially as described.

7. The combination of the drop-rod M, having a tension-spring, $m$, an inclined arm, $m^2$, an adjustable check, $m^4$, and the revolving lifting-rollers $b^3$, substantially as and for the purpose set forth.

8. The hand-lever N′, having rods $n$, $h$, and $o$, and bell-crank lever O, and connecting-rod $o'$, whereby the drop-rod M, the drop-pin H, and the vibrating tube I are moved in and out of action.

Witness my hand in the matter of my application for a patent for a corn-planter.

HENRY TIMMERSMANN.

Witnesses:
 W. B. LANGRIDGE,
 THOS. SMITH.